Patented Dec. 16, 1947

2,432,961

UNITED STATES PATENT OFFICE 2,432,961

SUBSTITUTED THIENO URACILS AND METHODS OF PREPARING SAME

Bernard R. Baker, Nanuet, N. Y., assignor to American Cyanamid Company, New York, N. Y., a corporation of Maine No Drawing. Application June 8, 1946, Serial No. 675,327

10 Claims. (Cl. 260—251)

The present invention relates to tetrahydrothieno uracils and to methods of preparing the same and is a continuation in part of my copending application Serial No. 610,185, filed August 10, 1945.

I have discovered a method of preparing the 8-substituted tetrahydrothieno uracils which comprises heating a 2-substituted-4-carbamylthiophane-3-isocyanate with a carboxylic acid anhydride and a mild alkali. This method may be illustrated by the following general equation:

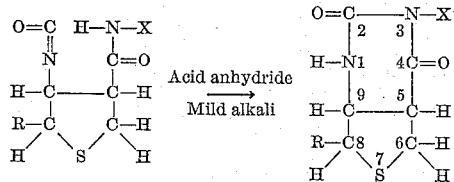

in which X is a member of the group consisting of hydrogen, aliphatic and aromatic radicals and R is a non-functional radical such as hydrogen, alkyl, carboxy, carboxyalkyl, carbalkoxyalkyl, carbaryloxyalkyl or other organic radical which does not react with the reagents employed in the reaction.

In general, the compounds of the present invention are white crystalline solids, slightly soluble in water, methanol, ethanol, dioxane, and other oxygenated solvents. They are particularly useful as intermediates in the preparation of compounds having biological activity such as biotin and other compounds having anti-biotin activity.

In preparing the compounds of the present invention, I heat a carbamyl thiophane isocyanate with an anhydride of a carboxylic acid, preferably a volatile one, such as acetic or propionic anhydride and an alkaline substance such as sodium carbonate, sodium bicarbonate, potassium acetate, sodium acetate and tertiary organic bases such as pyridine, triethylamine, tributylamine, etc. The reaction mixture may be heated at a temperature of from 50° to 150° C. for from 5 minutes to about 5 hours. However, I prefer to carry out the reaction at refluxing temperatures which usually takes from 15 minutes to an hour and a half. Although a solvent is usually not necessary, I can, if desired, use a solvent such as dioxane, dibutyl ether, acetic acid, propionic acid, etc.

When carrying out the reaction described above, using an anhydride such as acetic anhydride, a uracil compound is obtained having an acetyl radical attached to the nitrogen directly attached to the thiophane nucleus. While this intermediate can be isolated, I prefer not to isolate it, but to heat the reaction mixture with a mineral acid thus removing the group. The desired product of the invention is then recovered from the reaction mixture by concentrating the mixture, adding water to precipitate the product, and separating by filtration. The product can be further purified by recrystallization from methyl Cellosolve, water, methanol, ethanol, propanol or mixtures thereof.

I can use a number of 2-substituted 4-carbamylthiophane-3-isocyanates as intermediates to prepare the compounds of the present invention. Among these may be mentioned specifically: 2-(delta-carboxybutyl)-4-carbanilidothiophane 3-isocyanate; 2-(delta-carboxybutyl)-4-carbamylthiophane-3-isocyanate; 2-(epsilon-hydroxyamyl)-4-carbanilido thiophane-3-isocyanate; 2-propyl-4-carbanilidothiophane-3-isocyanate; 2-(delta - carboxybutyl) - 4 - methylcarbamylthiophane-3-isocyanate; 2-(gamma-carboxypropyl)-4-carbanilidothiophane-3-isocyanate; 2-(delta-phenoxybutyl) - 4 - carbanilidothiophane - 3 - isocyanate; 2-(gamma-methoxypropyl) - 4 - carbanilidothiophane - 3 - isocyanate; 2-(delta-carboxybutyl) - 4 - ethylcarbamylthiophane - 3 - isocyanate; 2-(delta-methoxybutyl)-4-carbanilidothiophane - 3 - isocyanate; 2 - (gamma - phenoxypropyl) - 4 - carbanilidothiophane - 3 - isocyanate; 2 - (delta - carbomethoxybutyl) - 4 carbanilidothiophane - 3 - isocyanate; 2 - carboxy-4-carbanilidothiophane-3-isocyanate; and others.

The process of the present invention provides a method of converting 3,4-substituted-transthiophanes into the cis configuration. In order to obtain dl biotin the 3,4-diaminothiophane used in the final step of my process should have the cis configuration. I can obtain the desired 3,4-cis-diaminothiophane from the thieno uracils of the present invention by cleaving the uracil ring with hydrazine hydrate to obtain a ureylenethiophane cis carboxyhydrazide. These compounds can be made to undergo a simultaneous rearrangement and ring closure giving a substituted imidazolidothiophane. The imidazolidothiophanes can be converted to a 3,4-cis-diaminothiophane which is directly convertible to dl biotin by treatment with phosgene.

My invention will now be illustrated in greater detail by means of the following specific examples, in which representative thieno uracils are prepared from corresponding carbamylthiophane isocyanates. It will be understood, of course, that these examples are given for purposes of illustration and are not to be considered as limiting my invention to the particular details described therein.

Example 1

To a mixture of 55 g. of 2-(delta-carbomethoxybutyl) - 3 - keto - 4 - carbomethoxythiophane (prepared by the method of Karrer et al., Helv. Chim. Acta. 27, 237–246 (1944)) and 20 cc. of liquid hydrogen cyanide at 0° C. was added 0.3 cc. of 50% potassium hydroxide. After 16 hours at 0° C., the mixture was acidified with 1 cc. of 85% phosphoric acid and the volatile material removed in vacuo; finally at 100° C. a yield of 63 g. of 2-(delta-carbomethoxybutyl)-3-hydroxy-3-cyano-4-carbomethoxythiophane was obtained as a nearly colorless oil which partially crystallized on standing.

A solution of 62.5 g. of the cyanohydrin prepared immediately above in 100 cc. of benzene was dried with anhydrous sodium sulfate and the drying agent rinsed with 50 cc. of benzene. To the solution diluted with 150 cc. of reagent pyridine was added 43 cc. of phosphorus oxychloride. The temperature gradually rose to 40° C. and was occasionally cooled to maintain the temperature at 40° C.–48° C. After six hours the mixture was poured on ice. The separated organic layer, washed successively with dilute hydrochloric acid, aqueous sodium bicarbonate and dilute hydrochloric acid was then distilled. A yield of 41 g. of 2-(delta-carbomethoxybutyl)-3-cyano - 4 - carbomethoxy -4,5- dihydrothiophene was obtained as a yellow oil, boiling point 192°–198° C. (1 mm.).

A solution of 29.2 g. of the intermediate above in 90 cc. of acetic acid and 150 cc. of concentrated hydrochloric acid was refluxed for sixteen hours, then evaporated to dryness in vacuo. The residue was extracted with 300 cc. of hot acetone, filtered from ammonium chloride and the extract evaporated to dryness in vacuo. A quantitative yield of 2-(delta-carboxybutyl)-4,5-dihydrothiophene-3,4-dicarboxylic acid was obtained as a semi-crystalline mass.

A solution of 23.5 g. of 2-(delta-carboxybutyl) - 4,5-dihydrothiophene-3,4-dicarboxylic acid in 106 cc. of 10% sodium hydroxide and 140 cc. of water was stirred with 265 g. of 2% sodium amalgam at 70°–80° C. (bath temp.) for one hour. The decanted solution was acidified, saturated with sodium chloride and extracted with two 250 cc. portions of ethyl acetate. The extracts, dried with anhydrous magnesium sulfate, were evaporated to dryness and the semi-crystalline residue (22.5 g.) recrystallized from 1:4 ethyl acetate-benzene mixture. A yield of 11.4 g. (49%) of 2-(delta-carboxy-butyl)-thiophane-3,4-trans dicarboxylic acid was obtained.

A mixture of 20.6 g. of 2-(delta carboxybutyl)-thiophane-3,4-transdicarboxylic acid, 125 cc. of methanol, 175 cc. of chloroform and 5 cc. of concentrated sulfuric acid was refluxed for sixteen hours under a Soxhlet apparatus containing anhydrous magnesium sulfate in the thimble. The solution was washed with several volumes of water containing excess sodium bicarbonate. After distillation of the chloroform 22.5 g. (94%) of 2-(deltacarbomethoxybutyl)-3,4-trans-dicarbomethoxythiophane remained as an oil.

To a solution of the above trimethyl ester in 110 cc. of methanol was added 31 cc. of 10% sodium hydroxide. After a minimum of sixteen hours at room temperature, the solution was concentrated to about one-half its volume, diluted with 100 cc. of water and 300 cc. of saturated sodium bicarbonate solution and extracted with benzene. The benzene extract on evaporation gave a small amount of unchanged triester. The alkaline solution was acidified and extracted with benzene. The extract, washed with dilute hydrochloric acid, was evaporated leaving 17.6 g. (69%) of 2-(deltacarbomethoxybutyl)-3-carbomethoxythiophane-4-carboxylic acid.

To 25 g. of 2-(delta-carbomethoxybutyl)-3-carbomethoxythiophane trans-4-carboxylic acid and 100 cc. of benzene was added 25 cc. of thionyl chloride and the mixture refluxed for fifteen minutes. The excess thionyl chloride and benzene were removed in vacuo. The residue in 100 cc. of benzene was treated with 50 cc. of aniline. After five minutes the mixture was washed twice with dilute hydrochloric acid, once with dilute sodium bicarbonate and finally water. Evaporation gave a semi-solid which was recrystallized from methanol. A yield of 6.8 g. of 2-(delta-carbomethoxybutyl) - 3 - carbomethoxy-trans-4-carbanilidothiophane was obtained.

To a warm solution of 7 g. of the compound immediately above in 70 cc. of methanol was added 7 cc. of 10% sodium hydroxide solution. After sixteen hours at room temperature, the solution was concentrated on the steam bath with an air stream to remove most of the methanol, then diluted with water containing sodium bicarbonate. The unchanged diester (1.7 g.) was removed by filtration and the filtrate acidified. The solid was collected on a filter. A yield of 4.7 g. (69%) of 2-(delta-carbomethoxybutyl)-4-carbanilidothiophane - trans - 3 - carboxylic acid was obtained.

A mixture of 7.0 g. of 2-(delta-carbomethoxybutyl) -4-carbanilidothiophane - trans-3-carboxylic acid, 18 cc. of thionyl chloride and 25 cc. of dry ether containing 0.5% pyridine was shaken occasionally for thirty minutes. The mixture was evaporated to dryness in vacuo and the residue, dissolved in 50 cc. of acetone was added to a stirred, ice cooled solution of 5 g. of sodium azide in 50 cc. of water over a period of five minutes. After being stirred for thirty minutes at 0° C., the mixture was diluted to 250 cc. with ice water containing 15 cc. of saturated sodium bicarbonate solution. The slightly gummy azide was removed by filtration, washed with ice water and dried at room temperature and 1 mm. The azide was refluxed with 105 cc. of acetic anhydride and 3.5 g. of anhydrous sodium acetate for one hour, nitrogen evolution being complete in a few minutes. After the addition of 105 cc. of 6 N hydrochloric acid, the solution was refluxed for thirty minutes to remove the 1-acetyl and ester groups. The solution was concentrated in vacuo until the product began to separate, then diluted to 250 cc. with ice water. The product, 3 - phenyl - 8 (delta-carboxybutyl) - 5,6,8,9-tetrahydrothieno [3,4,e-cis] uracil, was collected on a filter and washed with water, then with ethyl acetate until the washings removed no more color; yield, 2.7 g. (41%), melting point 203–208° C.

Example 2

A mixture of 330 mg. of 2-(delta-carbomethoxybutyl) - 4 - carbanilidothiophane - trans-3-carboxylic acid, 1 cc. of thionyl chloride and 1.5 cc. of dry ether containing 0.5% pyridine was shaken occasionally for fifteen minutes. The solution was evaporated in vacuo, and the residue dissolved in 5 cc. of acetone and stirred with 0.3 g. of sodium azide in 3 cc. of water at 0° C., for thirty minutes. The mixture was diluted with ice water to 50 cc., 10 cc. of saturated sodium bicarbonate was added, and the azide extracted with reagent ethyl acetate. The extracts were dried with anhydrous magnesium sulfate at 0° C., then refluxed for thirty minutes and evaporated to dryness in vacuo. The residual oily isocyanate was refluxed with 3 cc. of acetic anhydride and 150 mg. of sodium acetate for twenty minutes. After the addition of 3 cc. of 6 N hydrochloric acid, the solution was refluxed thirty minutes to remove the methyl ester and 1-acetyl groups, evaporated to dryness in vacuo and diluted with water and ethyl acetate. The product was removed by filtration and washed with water and ethyl acetate. A yield of 80 mg. of 3-phenyl-8-(delta - carboxybutyl) - 5,6,8,9-tetrahydrothieno [3,4,e,cis] uracil was obtained.

*Example 3*

To a solution of 320 mg. of trans-4-carbanilidothiophane-3-carboxhydrazide in 4 cc. of 0.5 N hydrochloric acid cooled in an ice bath was added 100 mg. of sodium nitrite in 1 cc. of water over a period of five minutes. The gummy azide was extracted with reagent ethyl acetate and the extracts dried with anhydrous magnesium sulfate at 0° C. The solution was refluxed for twenty minutes, then evaporated to dryness in vacuo. The residual isocyanate was refluxed with 3 cc. of acetic anhydride and 150 mg. of sodium acetate for twenty minutes, then diluted with water; yield, 230 mg. (66%) of white crystals, melting point 236°–239° C. of 1-acetyl-3-phenyl-5,6,8,9-tetrahydrothieno [3,4,e,cis] uracil. A mixture with an authentic sample prepared by a different method gave no depression in melting point.

I claim:

1. Chemical compounds having the general formula:

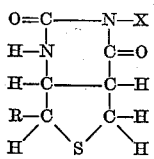

in which X is a member of the group consisting of hydrogen, aliphatic and aromatic radicals, and R is a member of the group consisting of hydrogen, alkyl, carboxy, carboxyalkyl, carbalkoxyalkyl and carbaryloxyalkyl radicals.

2. Chemical compounds having the general formula:

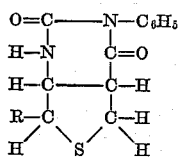

in which R is a carboxyalkyl radical.

3. 3-phenyl-8-(delta-carboxybutyl)-5,6,8,9-tetrahydrothieno [3,4,e,cis] uracil.

4. 3-phenyl-8-(delta-carbomethoxybutyl)-5,6,-8,9-tetrahydrothieno [3,4,e,cis] uracil.

5. 3-methyl-8-(delta-carboxybutyl)-5,6,8,9-tetrahydrothieno [3,4,e,cis] uracil.

6. A method of preparing compounds having the general formula:

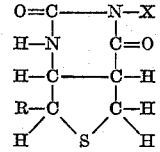

in which X is a member of the group consisting of hydrogen, aliphatic and aromatic radicals and R is a member of the group consisting of hydrogen, alkyl, carboxyalkyl and carbalkoxyalkyl radicals which comprises heating a carbamylthiophane isocyanate with a carboxylic acid anhydride and a mild alkali and subsequently with a mineral acid.

7. A method of preparing compounds having the general formula:

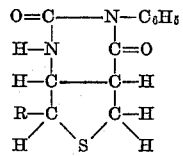

in which R is a member of the group consisting of hydrogen and carboxyalkyl radicals which comprises heating a compound having the formula:

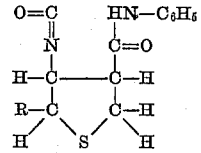

in which R is a member of the group consisting of hydrogen and carbalkoxyalkyl radicals, with a carboxylic acid anhydride and a mild alkali and subsequently with a mineral acid.

8. A method of preparing a 3-phenyl-8-carboxyalkyl 5,6,8,9-tetrahydrothieno [3,4,e,cis] uracil which comprises heating a 2-carbalkoxyalkyl-4-carbanilidothiophane-3-isocyanate with an alkali metal acetate and acetic anhydride and subsequently with a mineral acid.

9. A method of preparing 3-phenyl-8-(delta-carboxybutyl)-5,6,8,9 tetrahydrothieno [3,4,e,cis] uracil which comprises heating 2-(delta-carbomethoxybutyl)-4-carbanilidothiophane-3-isocyanate with an alkali metal acetate and acetic anhydride and subsequently with a mineral acid.

10. A method of preparing 3-methyl-8-(delta-carboxybutyl)-5,6,8,9-tetrahydrothieno [3,4,e,cis] uracil which comprises heating 2-(delta-carbomethoxybutyl)-4-methylcarbamylthiophane-3-isocyanate with an alkali metal acetate and acetic anhydride and subsequently with a mineral acid.

BERNARD R. BAKER.